United States Patent
Medberry et al.

(10) Patent No.: US 6,765,223 B2
(45) Date of Patent: Jul. 20, 2004

(54) SUB-MICRON ACCURACY EDGE DETECTOR

(75) Inventors: John Bernard Medberry, Windsor, CO (US); Edward Steketee, Ft. Collins, CO (US); James D Adams, Boulder, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 137 days.

(21) Appl. No.: 09/967,448

(22) Filed: Sep. 28, 2001

(65) Prior Publication Data

US 2003/0063294 A1 Apr. 3, 2003

Related U.S. Application Data

(63) Continuation-in-part of application No. 09/935,018, filed on Aug. 22, 2001.

(51) Int. Cl.[7] .............................. G01N 21/86; G01V 8/00
(52) U.S. Cl. ............................ 250/559.36; 250/559.29; 356/622
(58) Field of Search ....................... 250/559.36, 559.29, 250/559.43, 559.4, 559.01, 548; 356/622, 615, 237.1

(56) References Cited

U.S. PATENT DOCUMENTS

| | | | |
|---|---|---|---|
| 5,187,375 A | | 2/1993 | Masten |
| 5,389,789 A | * | 2/1995 | Nguyen ................... 250/341.1 |
| 5,389,795 A | * | 2/1995 | Rye ........................ 250/559.42 |
| 5,796,097 A | * | 8/1998 | Lawrence ................. 250/229 |
| 6,201,559 B1 | * | 3/2001 | Wada et al. .............. 250/205 |
| 6,256,555 B1 | * | 7/2001 | Bacchi et al. ............. 700/245 |
| 6,624,433 B2 | * | 9/2003 | Okumura et al. ......... 250/548 |
| 2003/0042441 A1 | * | 3/2003 | Steketee et al. .......... 250/559.36 |

* cited by examiner

*Primary Examiner*—Thanh X. Luu
*Assistant Examiner*—Seung C Sohn (57) ABSTRACT

An edge detector with sub-micron accuracy. The edge detector comprises two single mode optical fibers with an optical path between them. One fiber is coupled to a laser light source, and creates a light beam. The other fiber is coupled to an optical power detector. The optical power reaching the optical power detector is determined by how much of the light beam is obscured by an object. Thus the position of the edge of the object may be determined from the optical power measured by the detector. The edge of an object may be positioned automatically according to the optical power measured by the detector.

12 Claims, 10 Drawing Sheets

SUB-MICRON ACCURACY EDGE DETECTOR

PRIORITY CLAIM

This application is a continuation in part application that claims priority under 35 U.S.C. 120 to co-pending U.S. patent application Ser. No. 09/935,018, filed Aug. 22, 2001, which is herein incorporated by reference.

FIELD OF THE INVENTION

This invention relates generally to the field of assembly and test of electronic or optical components, such as integrated optical devices, and in particular to edge detection.

BACKGROUND OF THE INVENTION

The assembly and test of devices, such as integrated optical devices, require accurate alignment of components. For example, the assembly process for coupling optical fibers to optical chip components currently requires mechanical positioning to within 1 micron or less. The mechanical repeatability of chip placement equipment or manual loading of an optical chip into a test and assembly station, however, is much greater than 1 micron. Thus the position of the mating edges of a chip with respect to the mating fibers is known to an accuracy of no better than several microns. Consequently, additional steps must be taken to achieve sufficient accuracy in the relative positions of the components.

One approach is the use of a microscope together with manual positioning of the components. This approach requires trained and skilled operators. This is expensive and is subject to human error.

Another approach is the use of video microscopes in combination with image processing software and computer control of the positioning device. This type of equipment is expensive and relatively slow, and measurement accuracy is limited to a few microns.

The equipment used in these approaches tends to obstruct other processing equipment required to complete the assembly and test processes.

A further approach is the use of a light source and a light sensor to detect the edge of an object. The amount of light reaching the detector is reduced as the object obstructs the light path between the source and sensor. The accuracy of this approach is limited by the size of the detector and the accuracy to which the intensity of the light can be measured. Variations in the transfer efficiencies from the input current to the light source to the output current of the sensor introduce variability into the system, which limit the accuracy of this type of device. U.S. Pat. No. 5,187,375 to Masten describes an edge detection device with two detectors with the aim of mitigating this problem. However, in systems of this type, the accuracy is limited firstly because the sensor is responsive to ambient light and light from the source and secondly because the size of the detector is large compared to the sub-micron accuracy required. In the Masten detector, the sensor is much larger than the source and has a length of 100 mils (0.1 inches).

A still further approach is laser interferometry, in which the phase difference between a transmitted and a reflected beam of monochromatic light is used to determine a position. The approach requires complex equipment and is very expensive.

Accordingly, there is an unmet need in the art for an edge detector capable of determining the edge of an object to within a fraction of a micron.

Further, there is an unmet need for a non-contact positioning system that is capable of operating automatically and in real-time.

Still further, there is an unmet need for a non-contact positioning system that achieves sub-micron accuracy at a low cost.

BRIEF SUMMARY OF THE INVENTION

The invention relates generally to a method and apparatus for edge detection with sub-micron accuracy. The edge detection apparatus comprises two single mode optical fibers with an optical path between them. One fiber is coupled to a laser light source, and creates a light beam. The other fiber is coupled to an optical power detector. The optical power reaching the optical power detector is determined by how much of the light beam is obscured by an object. Thus the position of an edge of the object may be determined from the optical power measured by the detector.

An object may be positioned automatically according to the optical power measured by the detector.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

According to an apparatus of the present invention, an edge detector is provided that may be utilized for the detection of the edge of an object, such as an optical chip. Referring to the edge detector 100 shown in FIG. 1, a optical fiber 102, with a receiving end 104 and a transmitting end 106, is optically coupled to a laser light source 108, such as an L-band or C-band laser, at the receiving end 104 and creates a light beam at the transmitting end 106. A second optical fiber 110, with a receiving end 112 and a transmitting end 114, is optically coupled to an optical power detector 116 at the transmitting end 114. The optical power detector may be a junction photodiode, for example. The two optical fibers, 102 and 110, are held in place by a retainer 118, and positioned so that there is an optical path from the transmitting end 106 of the first fiber to the receiving end 112 of the second fiber. The light beam transmitted by the first optical fiber 102 is received by the second optical fiber 110 and transmitted to the optical power detector 116. In the preferred embodiment, the transmitting end of the first fiber 102 and the receiving end of the second fiber 110 are held co-axially in opposition, so that light passes directly from the first fiber to the second fiber. Only the ends of the fibers need be aligned, the remainder of the fibers may have any orientation. In a further embodiment, the optical path is indirect and may include one or more mirrors which reflect the light beam. While this may impair performance slightly, it may provide other benefits in some applications. In the preferred embodiment, the optical power detector converts the optical power into an electrical signal that may be coupled to a display or to a controller of a positioning system, as will be discussed later.

Figure 1:
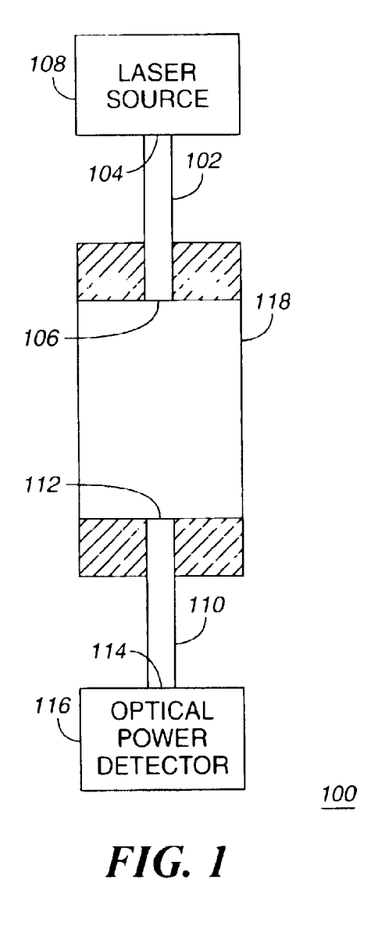
FIG. 1 is a diagrammatic representation of an edge detector in accordance with an embodiment of the invention.

The optical power detector may measure any quantity related to the amount of light reaching the detector. For example, the amplitude, root mean square amplitude or any function thereof may be used.

In the preferred embodiment, the fibers are single mode optical fibers. The transmitting end of the first fiber and the receiving end of the second fiber are positioned co-axially with a gap between them. Relative motion of the fibers may cause variation in the amount of light transmitted from the first fiber to the second fiber. In the preferred embodiment, the fibers are held in a retainer 118 so as to prevent relative motion of the fibers.

When the optical path between the two fibers is not obstructed, the optical power at the detector is at a maximum. The maximum power at the detector is denoted by $P_{max}$. In general, the maximum power reaching the detecting aperture is proportional to the emitter or source power. The emitter power is attenuated depending upon the geometry (e.g. shape, size and orientation), separation and alignment of the emitting and detecting apertures and the spreading of the light beam. The attenuation due to these factors may be determined either by calibration or by calculation, since the geometric properties of wave beams are well understood by those skilled in the art.

In one embodiment, the expected attenuation is computed in accordance with the geometric properties of the emitter and the detector and their relative positions. The actual attenuation is measured and compared to the calculated attenuation. This serves as a check that the emitter, detector and associated components are correctly aligned and operational.

When an object partially obstructs the optical path, part of the light beam is prevented from reaching the detector, and the optical power at the detector is attenuated. The power at the detector is $$P(d)=P_{max}F(d, \gamma),$$

where d is the depth the object has penetrated the beam and F(d) is a function dependent upon the distribution of light across the cross-section of the light beam and the optical properties of the object. The object may be partially translucent, so that optical power is not zero when the whole of the beam in interrupted by the object. This is often the case when the object is an optical component.

The ratio of the power at the detector to the maximum power is denoted as $$F(d) \equiv \frac{P(d)}{P_{max}}.$$

The function F(d) takes the value 1 when the object is outside of the beam. In one embodiment, the function P(d) is determined by calibration. In a further embodiment, the function F(d) is determined by calibration. This function may vary less over time than the function P(d), since it does not depend upon the strength of the laser source. In order to determine the function F(d), the optical power P(d) is be measured as a function of distance d and the function F is calculated from the ratio of powers as $$F(d) = \frac{P(d)}{P_{max}}.$$

The position of the object may be obtained as $$d = F^{-1}\left[\frac{P(d)}{P_{max}}\right],$$

where the inverse function $F^{-1}$ is evaluated analytically or by use of a look up table.

Figure 2:
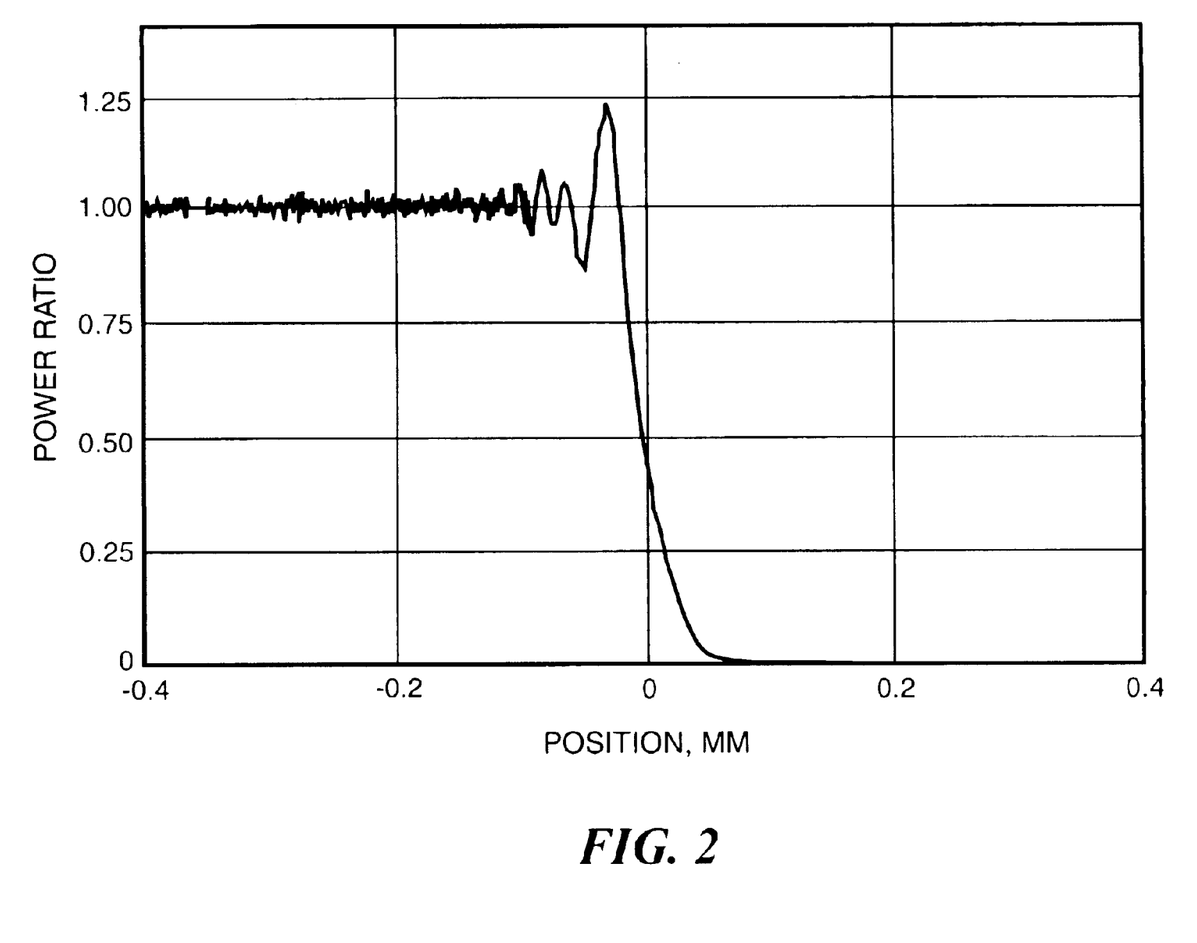
FIG. 2 is a graphical representation of an exemplary relationship between the position of an object and the output of an edge detector in accordance with the invention.

A plot of the power at the detector relative to the maximum power, $$F(d) \equiv \frac{P(d)}{P_{max}},$$

measured in accordance with the invention, is shown in FIG. 2. The horizontal axis in FIG. 2 denotes the distance of the edge of the object from the center of the beam. In this example, the object is opaque. When the edge is at the center of the beam, half of the power of the beam is blocked, giving a relative power of 0.5. The shape of the curve, which describes the relationship between the power measured at the detector and the position of the object, is dependent upon the cross-section of the beam and the properties of the optical fibers. For a particular system, this relationship may be obtained by calibration.

In particular, the position of the object determines how much light will be reflected from, transmitted through or absorbed by the object. The position, both perpendicular to the light beam and along the light beam, also determines how much light is diffracted by the edge of the object. This can be calculated as a function of position using known diffraction theories. Diffraction of light by the edge of the object results in an attenuation of the optical power that is not simply proportional to the area of the light beam obscured. Therefore it is desirable that diffraction be taken into account when determining the position of the edge relative to the emitter and detector. One approach is to calibrate the system by measuring the attenuation caused by the presence of an object and then determining the position of the object by an alternative means. Another approach is to calculate the attenuation as a function of the position of the edge using known diffraction theories. A further, related approach recognizes that the diffracted light alternately increases and decreases the optical power. This can be seen in FIG. 2. The oscillations in the relative power are due to diffraction. When the object obscures half of the beam (as depicted by position 0 in FIG. 2), there is no contribution from diffracted light, so 50% of the maximum optical power reaches the detector. Hence, the edge is at position 0 when the optical power at the detector has fallen to 50% of its maximum value.

An important property of the ratio of powers, denoted by the function F, is independent of the overall power or intensity of the laser light source. The ratio depends only on the distribution of light across the cross-section of the light beam and the optical properties of the object. These properties are generally not subject to change due to temperature variations, source strength, etc. The maximum power can be re-measured before an object enters the beam. This avoids the additional cost and complexity associated with prior edge detectors that required multiple sensors. In addition, laser light sources are generally very stable and monochromatic sources are less susceptible to interference from light reflected or refracted from nearby objects.

The sensitivity of the detector is quantified by how fast the ratio of powers changes with position. The ratio of power is a function of relative position $d/D$ of the object, hence the rate of change of power with respect to distance is $$\frac{\partial F(d)}{\partial d} = \frac{1}{D}\frac{\partial F(d)}{\partial (d/D)}.$$

The second term on the right hand side of the equation is a non-dimensional, geometric factor, so this shows that the sensitivity increases as the depth of the beam, D, decreases. Thus the use of a very narrow beam, as provided by the laser light source and single mode optical fibers of the present invention, results in a very sensitive edge detector. In general, the sensitivity is at a maximum where the width of the beam (parallel to the edge) is greatest.

The sensitivity is further enhanced by the use of a laser light source because the light beam is monochromatic. Ambient light with wavelengths longer or short than the laser light wavelength can be filtered out by the detector. Further, light with wavelengths longer than the cut-off wavelength of the single mode fiber will be attenuated in the fiber.

In an automatic control system, the position of the object may be adjusted until the ratio of powers R is within a specified range. That is, the position is adjusted until the condition $$\alpha < \frac{P(d)}{P_{\max}} < \beta$$

is satisfied, where $\alpha$ and $\beta$ are threshold levels which satisfy $0<\alpha<\beta<1$. The parameters $\alpha$ and $\beta$ may be chosen to give a required accuracy relative to the width of the beam. Equivalently, the position of the object may be adjusted until the optical power P is within a specified range. For example, the position may be adjusted until the condition $\alpha P_{max}<P<\beta P_{max}$ is satisfied. The value of $P_{max}$ may be predetermined or re-measured at regular intervals. In a still further embodiment, the position may be adjusted until the condition $P_{min}+\alpha(P_{max}-P_{min})<P<P_{min}+\beta(P_{max}-P_{min})$ is satisfied. The value of $P_{min}$ denotes the value of the optical power when the object completely obscures the beam. The value may be predetermined or re-measured at regular intervals. An advantage of this embodiment is that it is less sensitive to variations in opacity between different objects.

The object may be positioned using a positioning stage, controlled by a linear servo-motor for example. Such positioning stages capable of moving an object in increments of 50 nano-meters or less are commercially available.

For example, if it is desired that the object is to be positioned in the range $d_1<d<d_2$, the condition $P(d_2)<P(d)<P(d_1)$ must be satisfied, or, equivalently, $$F(d_2)P_{max}<P(d)<F(d_1)P_{max}.$$

In this example the parameters are $\alpha=F(d_2)$ and $\beta=F(d_1)$. If the detector is used in conjunction with a positioning stage that is controlled in discrete steps of size $\delta$, $d_1$ and $d_2$ may be chosen so that $d_1=d_0-\delta/2$ and $d_2=d_0+\delta/2$, where $d_0$ is the desired position.

Figure 3:
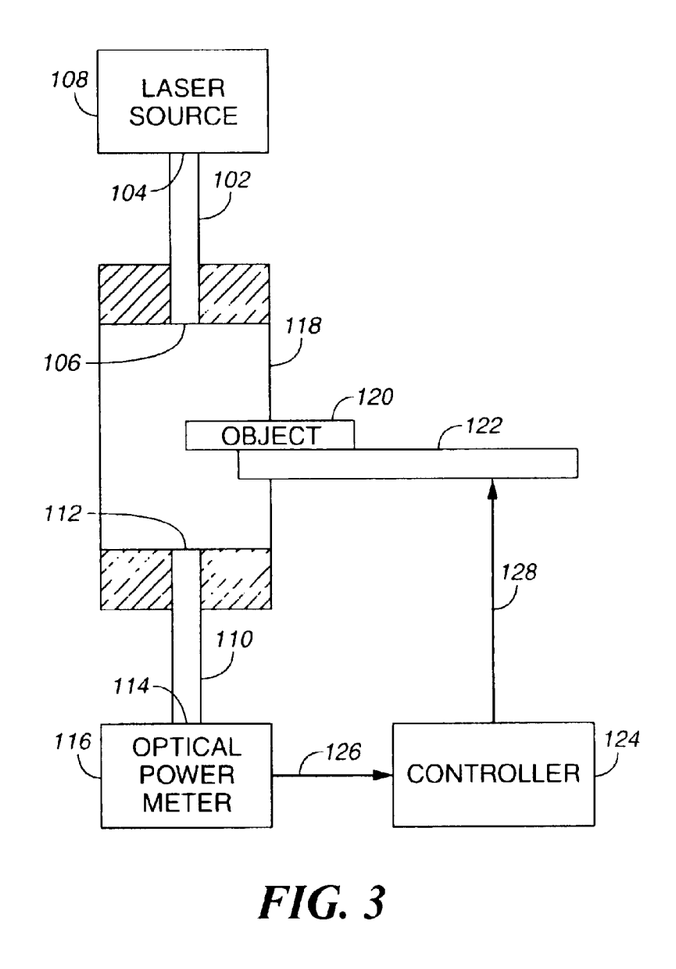
FIG. 3 is a diagrammatic representation of an automatic positioning system incorporating an edge detector in accordance with one embodiment of the invention.

In one embodiment, the positioning stage is controlled automatically by a controller. This is shown diagrammatically in FIG. 3. The object is supported by a positioning stage 122, which allows the position of the object 120 to be adjusted relative to the position detector. A controller 124 receives the detector output signal 126 from optical power detector 116. The controller is preferably implemented in software running on a computer, but an analog controller may be used. In response to the detector output signal 126, the controller produces a control signal 128 that is passed to the positioning stage 122. One control strategy is to scan through a range of positions until the condition $P(d_2)<P(d)<P(d_1)$ is satisfied. Another control strategy is to change the position according to the difference between current optical power, $P(d_{current})$, and the optical power at the desired position, $P(d_0)$. This can be written as $$d_{new}=d_{current}+G(P(d_{current})-P(d_0))$$

where G is a linear or non-linear gain function, which may depend upon $P(d_{current})$ or $F(d_{current})$. For example, the gain function might be $$G(x) = -\mu F^{-1}\left(\frac{x}{P_{\max}}\right),$$

where $\mu$ is a parameter.

In a further embodiment, the detector may be moved to determine the position of an edge of a stationary object.

Figure 4:
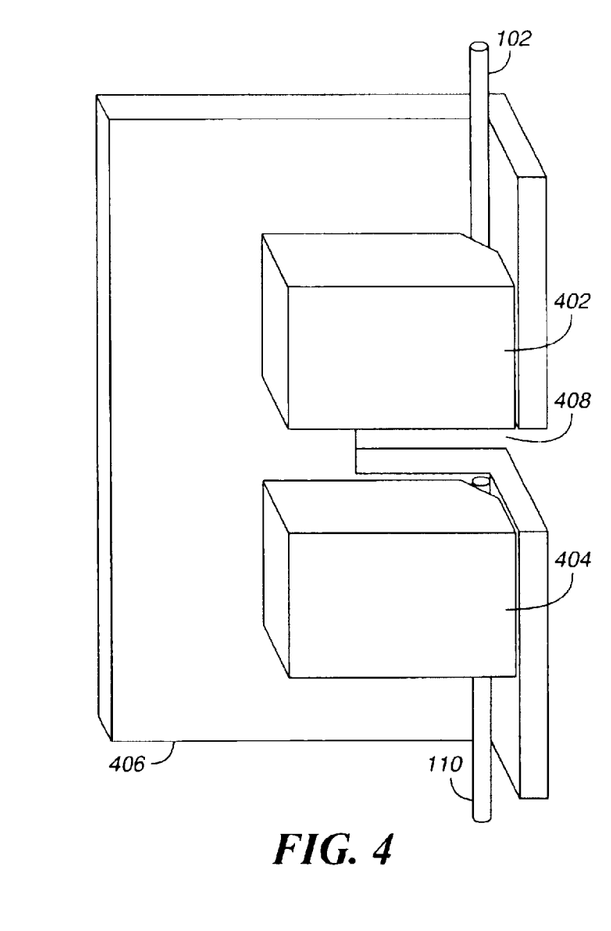
FIG. 4 is a diagrammatic representation of a fiber retainer of an edge detector of the invention.

The optical fibers may be held by a fiber retainer. In the preferred embodiment, the fiber retainer comprises a retaining block with a beveled edge and a frame as shown in FIG. 4. The optical fibers 102 and 110 are held in channels formed between the beveled edge of retaining blocks 402 and 404 and frame 406. The retaining blocks are preferably composed of a material that is compliant relative to the fiber so as to avoid damage to the fiber. A polycarbonate material, such as Delrin plastic, may be used. The frame 406 holds both optical fibers. A single retaining block may be used, or, as in FIG. 4, one retaining block may be used for each optical fiber. The frame 406 holds the fibers coaxially in opposition to create a detection gap 408 for receiving an object. The frame 406 may also function as a guide for the optical fibers. The retaining blocks are shown as being rectangular in FIG. 4. Other shapes may be used for the retaining blocks. For example, curved blocks may be used to change the orientation of the fibers so that the fibers emerge from the frame parallel to each other.

Other fiber retainers will be apparent to those skilled in the art. These include clamps of various kinds. The fibers may be embedded in the fiber retainer or banded to it.

Figure 5:
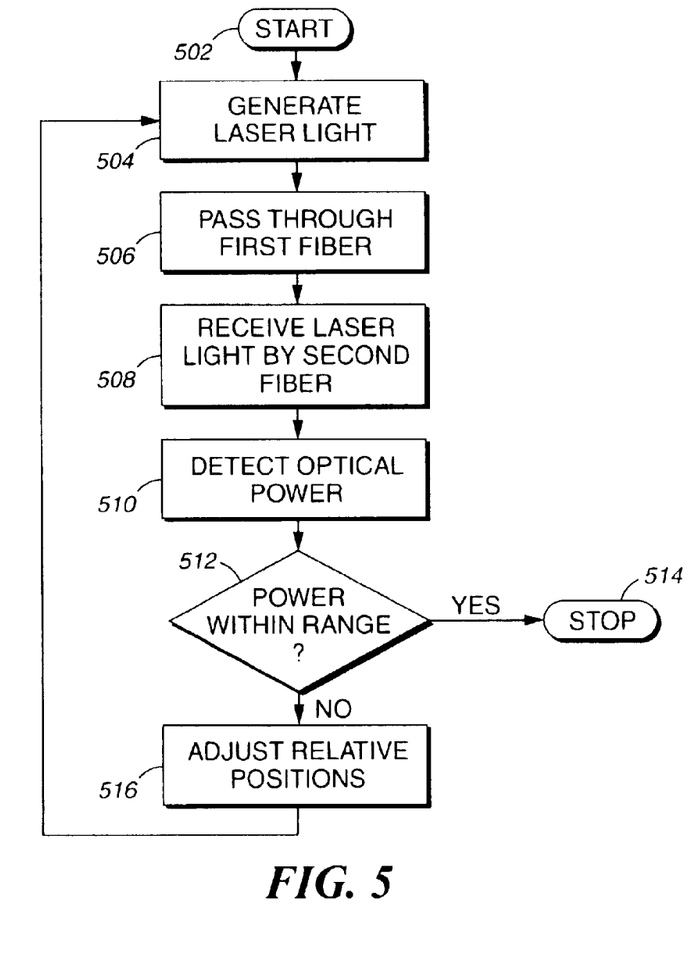
FIG. 5 is a flow chart depicting the method of positioning the edge of an object in accordance with the invention.

A flow chart depicting the method of positioning the edge of an object is shown in FIG. 5. Starting at block 502, laser light is generated at block 504 from a laser light source. At block 506 the laser light is passed through a first optical fiber, coupled at one end to the laser light source. This forms a beam of light at the other end of the first optical fiber. The beam is received by the end of a second optical fiber at block 508 and is passed to an optical power detector at block 510. At decision block 512, a check is made to determine if the optical power is within a predetermined range. If it is within the range, as depicted by the positive branch from decision block 512, the predetermined amount of light is reaching the detector, which implies that a correct fraction of the beam is being block by an object within the beam, which in turn implies that the edge of the object is at the desired position relative to the detector. The process is then terminated at block 514. If the optical power is not within the predetermined range, as depicted by the negative branch from decision block 512, the relative position of the object and the detector is adjusted at block 516. This may be achieved by moving the detector or by moving the object.

In one embodiment of the invention, the predetermined range for the optical power is chosen to be a range including 50% of the maximum power, i.e. the relative power is required to satisfy:

$$0.5 - r_1 < \frac{P(d)}{P_{max}} < 0.5 + r_2$$

where $r_1$ and $r_2$ are constants. The values of these constants determine the sensitivity of the edge detection system. In this range, the effects of diffraction from the edge of the object are minimized.

Figure 6:
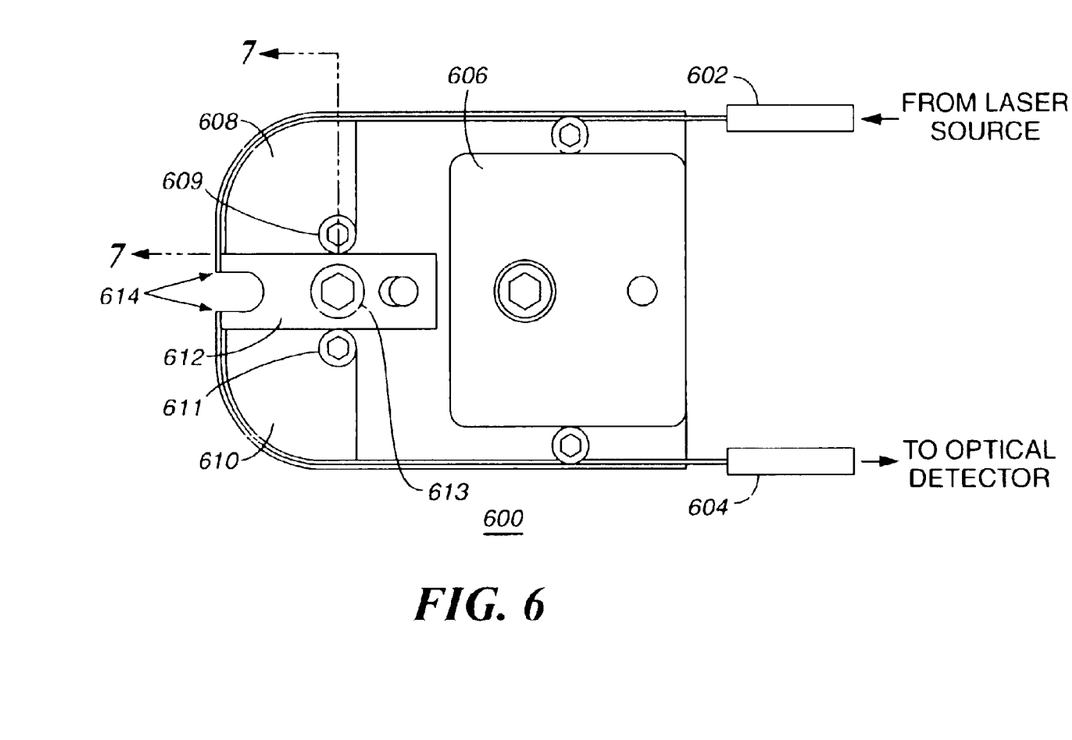
FIG. 6 is a representation of the preferred embodiment of the edge detector of the invention.
Figure 7:
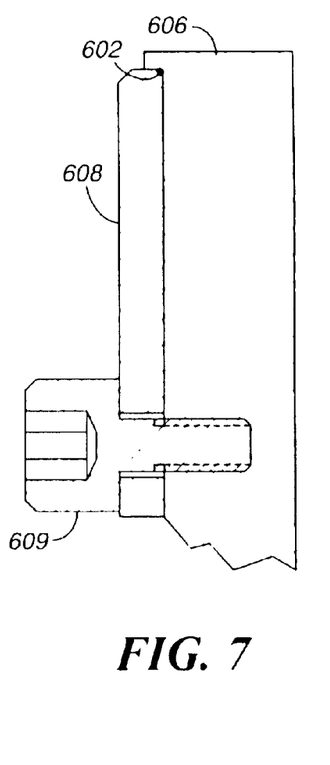
FIG. 7 is a cross-section through the edge detector shown in FIG. 6 in accordance with certain embodiments of the invention.
Figure 8:
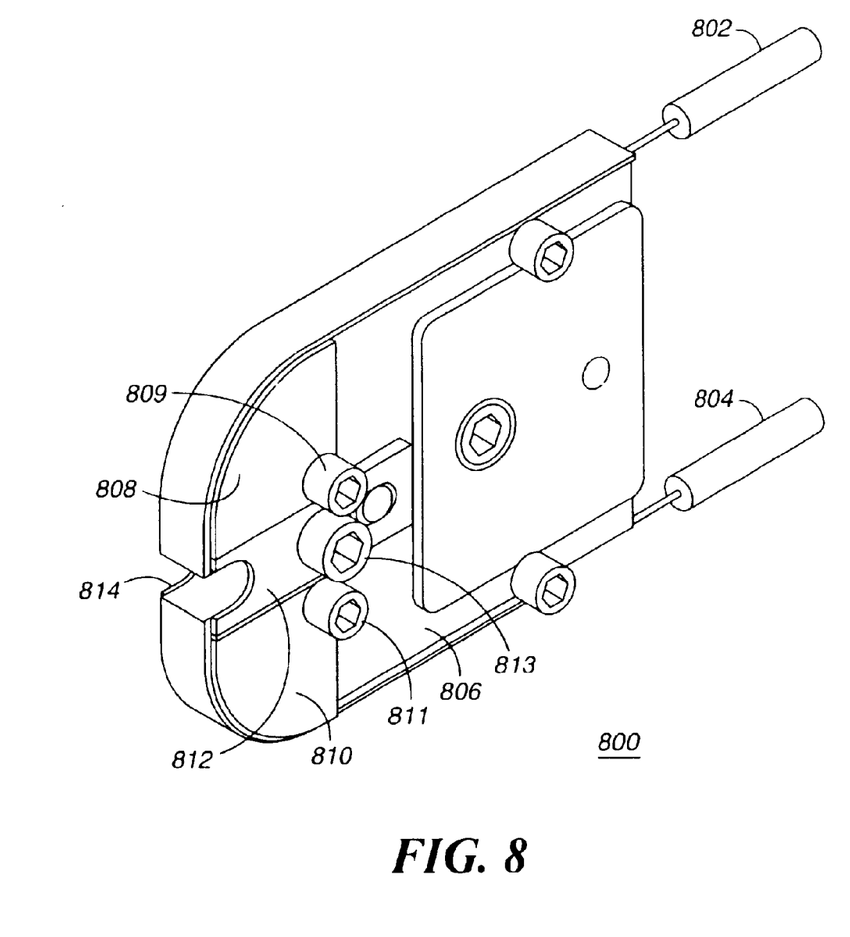
FIG. 8 is a further representation of an edge detector in accordance with certain embodiments of the invention.

A representation of the preferred embodiment of the edge detector of the present invention is shown in FIGS. 6, 7 and 8. FIG. 6 is a side view of the edge detector 600. The edge detector 600 comprises an optical fiber 602 and output optical fiber 604 that are held between the frame 606 and retaining blocks 608. In this embodiment the face of the retaining blocks with a beveled edge are curved so as to bend the fibers through a 90° angle. The retaining blocks are secured to the frame 606 with screws 909 and 611 or other suitable securing means. The frame 606 functions as a guide for the optical fibers. The optical fibers are further secured by a clamp 612 that is secured to the frame 606 by a screw 613 passing through a slot in the clamp. The clamp further restricts motion of the fibers with respect to the frame by holding the fiber between the face of the clamp and the frame. The light passes from the transmitting end of the input optical fiber 602 to the receiving end of the output optical fiber 604 across the detection gap 614. The laser light source and the optical power detector are not shown in this figure and may be at a remote location. FIG. 7 shows the cross-section labeled as "7" in FIG. 6. The input optical fiber 602 is held in a channel formed between two faces of the frame 606 and the beveled edge of the retaining block 608. The retaining block 608 is secured to the frame 606 by screw 609.

FIG. 8 illustrates an isometric view of edge detector 600.

Figure 9:
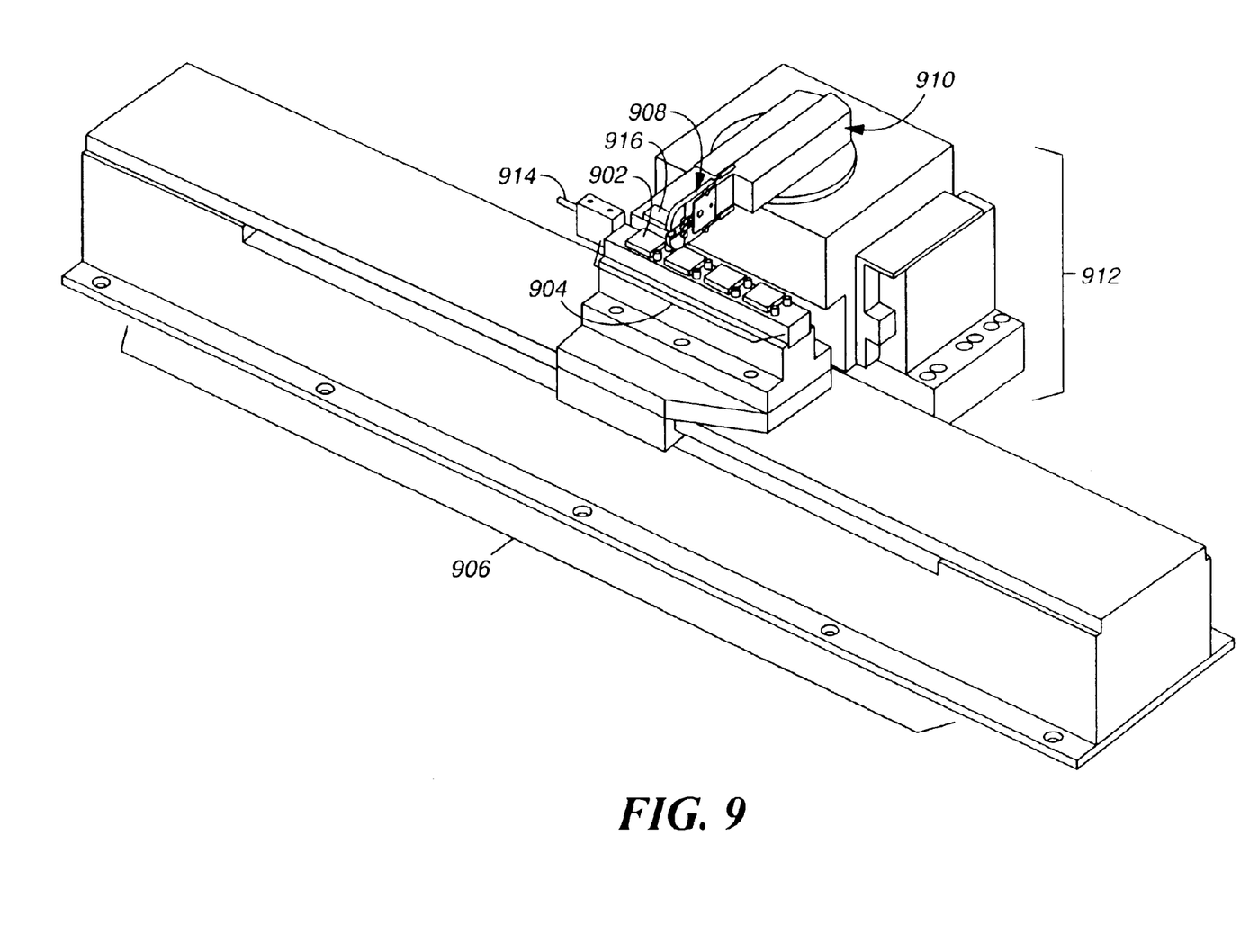
FIG. 9 is a representation of a system incorporating an edge detector in accordance with certain embodiments of the invention.

A system incorporating the edge detector is shown in FIG. 9. An object 902 with an edge to be detected is placed in holder 904, which is in turn mounted on object positioning stage 906. The position of the holder 904 along the length of the object positioning stage 906 may be adjusted by a linear servo-motor or other suitable adjustment means. The edge detection device 600 is mounted on positioning platform 910, which is in turn mounted on detector positioning stage 912. The position of the holder 910 relative to the detector positioning stage may be varied by a linear servo-motor in a direction perpendicular to the object positioning stage 906. An edge detector calibration fiduciary 914 is attached to the holder 904 at a known location and is used in the calibration of the edge detector. This fiduciary can be used to calibrate the position stage, so that the relative positions of the stage and the detector are known.

Figure 10:
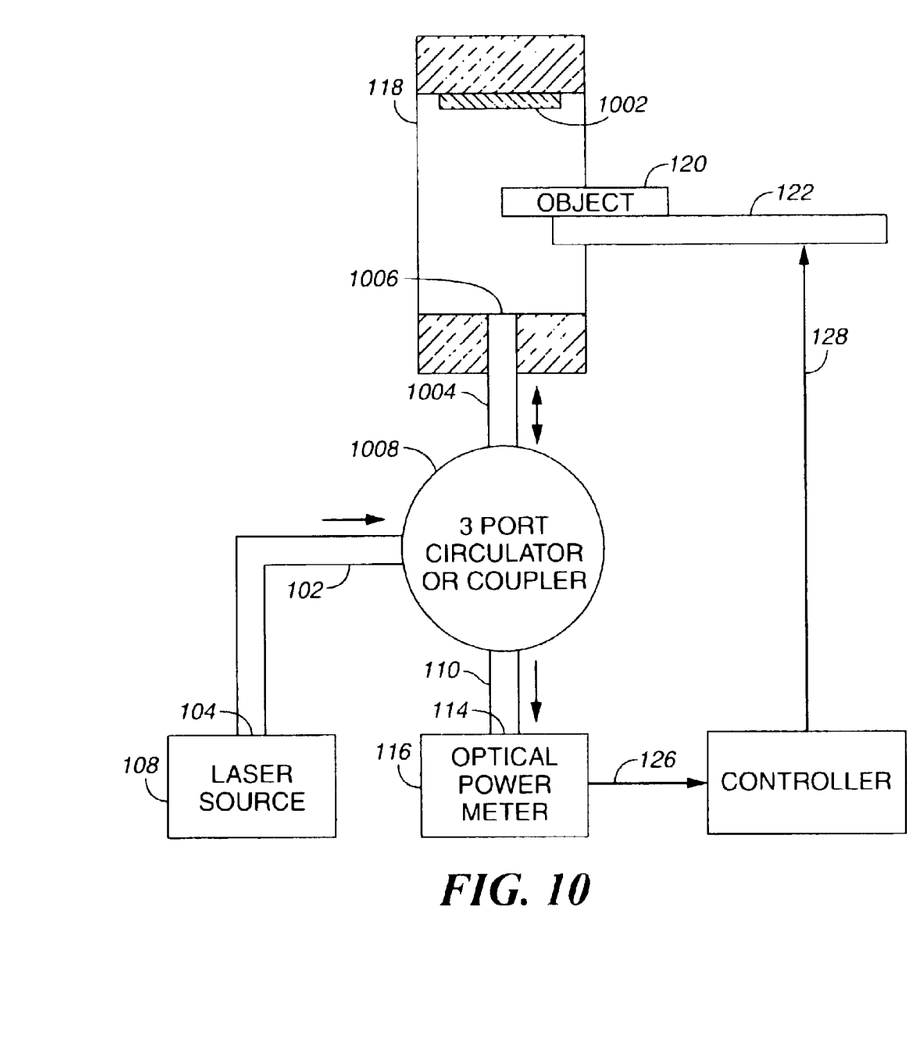
FIG. 10 is a representation of a system incorporating an edge detector in accordance with certain embodiments of the invention.

In a further embodiment, the first and second fibers comprise a single fiber. Referring to FIG. 10, an object 120 is supported by a positioning stage 122, which allows the position of the object 120 to be adjusted relative to the position detector. A controller 124 receives the detector output signal 126 from optical power detector 116. The controller is preferably implemented in software running on a computer, but an analog controller may be used. In response to the detector output signal 126, the controller produces a control signal 128 that is passed to the positioning stage 122. A laser light source 108 is optically coupled via a first optical fiber 102 to a first port of a three port circulator. Light is transmitted though the three port circulator to a single fiber 1004 coupled to the second port of the three port coupler. The light is transmitted to the end 1006 of the fiber 1004 and creates a light beam. The optical fiber 1004 held in place by a retainer 118, and positioned so that there is an optical path from the end 1006 of the fiber to a mirror 1002 and back to the end 1006 of the fiber 1004. The light beam received by the fiber is transmitted back to the second port of the three port circulator where it is guided to the third port of the circulator. An optical power meter 116 is optically coupled via a second optical fiber 110, to a third port of the three port circulator and receives the light reflected back from the mirror. When the object partially interrupts the light beam, the optical power reaching the optical power meter 116 is reduced. The position of the object may be adjusted by controller 124 in response to the output 126 from the optical power meter, so that the object is in a desired position relative to the fiber retainer 118.

Figure 11:
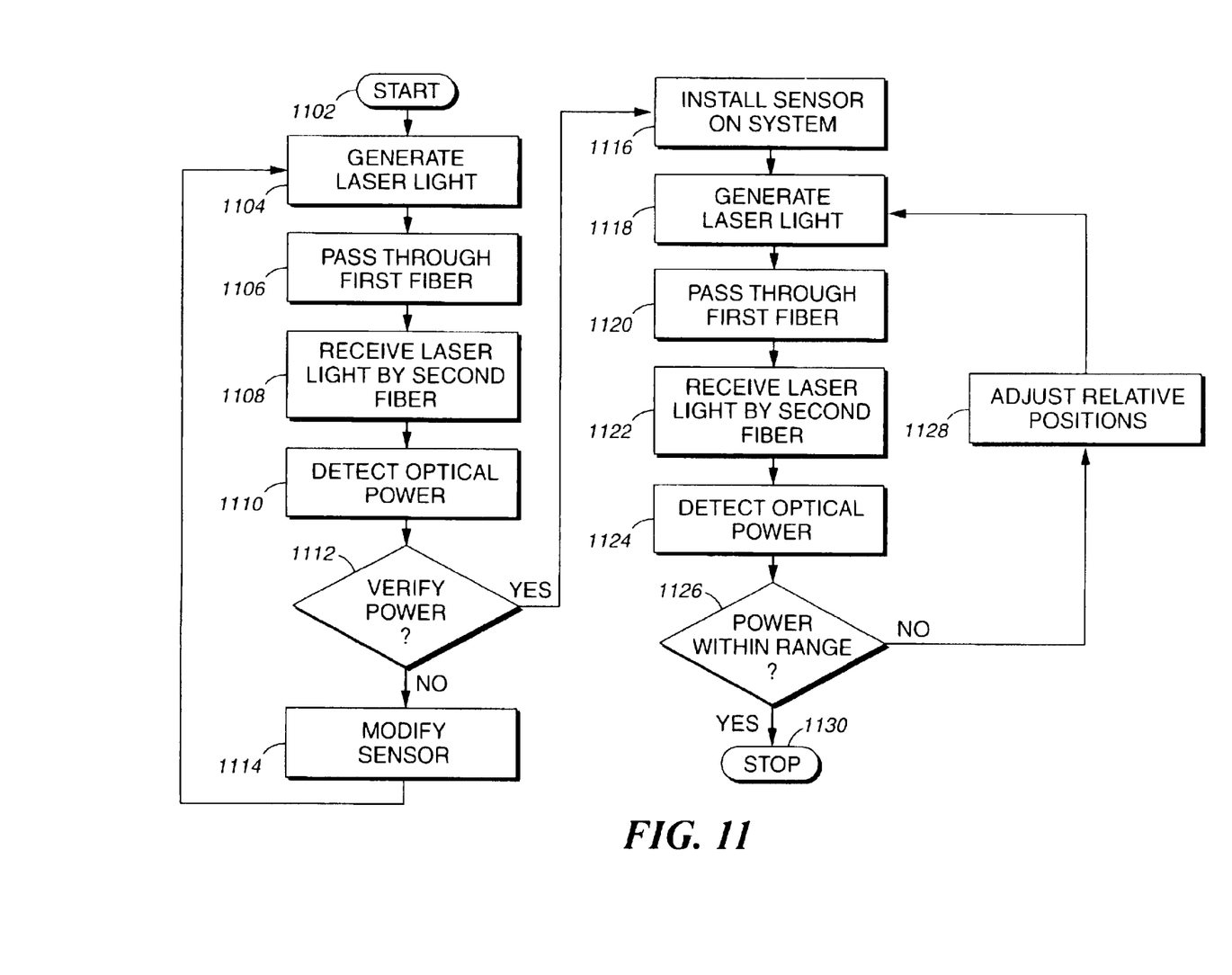
FIG. 11 is a flow chart depicting the method of positioning the edge of an object in accordance with certain embodiments of the invention.

A flow chart depicting a further embodiment of the method for positioning the edge of an object is shown in FIG. 11. Starting at block 1102, laser light is generated at block 1104 from a laser light source. At block 1106 the laser light is passed through a first optical fiber, coupled at one end to the laser light source. This forms a beam of light at the other end of the first optical fiber. The beam is received by the end of a second optical fiber at block 1108 and is passed to an optical power detector at block 1110. This detected optical power may be used a baseline or reference optical power for later measurements. At decision block 1112, a check is made to determine if the detected optical power is substantially equal to a calculated optical power. The calculated optical power depends upon the geometry (i.e. shape and size and orientation) of the transmitting end of the transmitting fiber and the receiving end of the detector fiber. It also depends upon the spacing between the fibers and their orientation relative to one another. If the detected optical power is not substantially equal to the calculated optical power, as depicted by the negative branch from decision block 1112, the sensor is checked and modified as necessary at block 1114. The verification process is then repeated. The verification of the sensor system may occur before or after the sensor has been installed on a system for edge detection. If the check is made prior to installation, the next step is the installation of the sensor on the system at block 1116. The system is then ready to be used for edge detection.

Laser light is generated at block 1118 from a laser light source. At block 1120 the laser light is passed through a first optical fiber, coupled at one end to the laser light source. This forms a beam of light at the other end of the first optical fiber. The beam is received by the end of a second optical fiber at block 1122 and is passed to an optical power detector at block 1124. At decision block 1126, a check is made to determine if the optical power is within a predetermined range. For example, a range including the power that is half of the baseline optical power detected at block 1112 may be used. If it is within the range, as depicted by the positive branch from decision block 1126, the predetermined amount of light is reaching the detector, which implies that a correct fraction of the beam is being block by an object within the beam. This in turn implies that the edge of the object is at the desired position relative to the detector. The process then terminates at block 1130. If the optical power is not within the predetermined range, as depicted by the negative branch from decision block 1126, the relative position of the object and the detector is adjusted at block 1128. This may be achieved by moving the detector or by moving the object.

It will be apparent to those of ordinary skill in the art that other optical devices, such as 3dB coupler, may be substituted for the three port circulator described above.

In a still further embodiment, the fiber retainer is attached to a positioning stage which, in turn, may be controlled by the controller 124, and the position of the fiber retainer is moved relative to the object.

While the invention has been particularly shown and described with reference to a preferred embodiment, it will be understood by those skilled in the art that various changes in form and detail may be made therein without departing from the spirit and scope of the invention.

What is claimed is:

1. A device for positioning an edge of an object, said device comprising:
   a laser light source;
   a first single-mode optical fiber, with a receiving end and a transmitting end, optically coupled to the laser light source at the receiving end and creating a light beam at the transmitting end;
   an optical power detector, providing an optical power signal as output;
   a second single-mode optical fiber, with a receiving end and a transmitting end, optically coupled to the optical power detector at the transmitting end;
   a retainer for holding said first and second single-mode optical fibers such that the receiving end of the second single-mode optical fiber receives the light beam;
   a positioning stage for adjusting the relative positions of the object and the light beam; and
   a controller operably coupled to the positioning stage and responsive to the optical power signal, the controller being configured to cause the positioning stage to position the object at a predetermined position relative to the light beam,
   wherein the position of the object relative to the light beam is adjusted so that the optical power signal is greater than a lower threshold and less than an upper threshold and at least one of the lower and upper thresholds is proportional to a maximum power which is the optical power at the detector when no part of the object obstructs the light beam, and wherein the maximum power is determined by calculation from an optical power transmitted from the transmitting end of said first optical fiber, the geometric properties of the receiving end of the second single-mode optical fiber and the relative positions of the first and second single-mode optical fibers.

2. A device for positioning an edge of an object, said device comprising:
   a laser light source;
   a first single-mode optical fiber, with a receiving end and a transmitting end, optically coupled to the laser light source at the receiving end and creating a light beam at the transmitting end;
   an optical power detector, providing an optical power signal as output;
   a second single-mode optical fiber, with a receiving end and a transmitting end, optically coupled to the optical power detector at the transmitting end;
   a retainer for holding said first and second single-mode optical fibers such that the receiving end of the second single-mode optical fiber receives the light beam;
   a positioning stage for adjusting the relative positions of the object and the light beam; and
   a controller operably coupled to the positioning stage and responsive to the optical power signal, the controller being configured to cause the positioning stage to position the object at a predetermined position relative to the light beam,
   wherein the position of the object relative to the light beam is adjusted so that the optical power signal is greater than a lower threshold and less than an upper threshold and at least one of the lower and upper thresholds is proportional to a maximum power which is the optical power at the detector when no part of the object obstructs the light beam, and wherein said lower threshold is less than half of said maximum power and said upper threshold is greater than half of said maximum power.

3. An edge detector for detecting an edge of an object, said edge detector comprising:
   an optical coupler, having at least three ports adapted to receive laser light at a first port of the at least three ports;
   an optical fiber optically coupled to and receiving laser light from a second port of the at least three ports at a first end and creating a light beam at a second end;
   a mirror separated from the second end of the optical fiber by a gap and positioned to receive the laser light beam and reflect it back to the second end of the optical fiber;
   a retainer for holding the optical fiber and the mirror;
   an optical power meter optically coupled to a third port of the at least three ports, the optical power meter having an output indicative of the optical power of the light transmitted through the second optical fiber;
   a positioning stage for adjusting the relative positions of the object and the light beam; and
   a controller operably coupled to the positioning stage and responsive to the optical power signal, the controller being configured to cause the positioning stage to position the object at a predetermined position relative to the light beam,
   wherein the position of the object relative to the light beam is adjusted so that the optical power signal is greater than a lower threshold and less than an upper threshold, so that the edge of the object is detected when an object in the gap at least partially obstructs the light beam, causing a change in the output of the optical power meter, wherein at least one of the lower and upper thresholds is proportional to a maximum power which is the optical power at the detector when no part of the object obstructs the light beam, and wherein said lower threshold is less than half of said maximum power and said upper threshold is greater than half of said maximum power.

4. A method for positioning an edge of an object, said method comprising:

generating a light beam by passing light from a laser light source through a first single-mode optical fiber;

receiving the light beam from the first optical fiber through a second single-mode optical fiber;

detecting the optical power of the received light; and positioning the edge of the object within the light beam such that the optical power of the received light is greater than a lower threshold and less than an upper threshold, wherein at least one of the lower and upper thresholds is proportional to a maximum power which is the optical power at the detector when no part of the object obstructs the light beam, and wherein said lower threshold is less than half of said maximum power and said upper threshold is greater than half of said maximum power.

5. A method for positioning an edge of an object, said method comprising:

generating a light beam by passing light from a laser light source through a first single-mode optical fiber;

receiving the light beam from the first optical fiber through a second single-mode optical fiber;

detecting the optical power of the received light; and positioning the edge of the object within the light beam such that the optical power of the received light is greater than a lower threshold and less than an upper threshold, wherein the maximum power is determined by calculation from an optical power transmitted from the transmitting end of said first single-mode optical fiber, the geometric properties of the receiving end of the second single-mode optical fiber and the relative positions of the first and second single-mode optical fibers.

6. A method for positioning an edge of an object, said method comprising:

generating a light beam by passing light from a laser light source through a first optical fiber;

receiving the light beam from the first optical fiber through a second optical fiber;

detecting a first optical power of the received light;

calculating an estimated optical power of the received light;

comparing said first optical power and said estimated optical power, and, if they are in substantial agreement:
detecting a second optical power of the received light; and
positioning the edge of the object within the light beam such that the second optical power of the received light is greater than a lower threshold and less than an upper threshold.

7. A device as in claim 6, wherein said lower threshold is less than half of said first optical power and said upper threshold is greater than half of said first optical power.

8. A method for detecting an edge of an object, said method comprising:

generating a laser light beam;

receiving the laser light beam at a receiving end of a first single-mode optical fiber;

detecting the optical power of the received laser light beam; and positioning the edge of the object within the laser light beam such that the optical power of the received laser light beam is greater than a lower threshold and less than an upper threshold, wherein the lower threshold is less than half of the optical power at the detector when no part of the object obstructs the light beam and said upper threshold is greater than half of optical power at the detector when no part of the object obstructs the light beam.

9. A method as in claim 8, wherein generating the laser light beam comprises:

optically coupling a laser light source to a second optical fiber optically aligned with the receiving end of the first optical fiber.

10. A method as in claim 8, further comprising:

detecting the optical power of the received laser light when no part of the object obstructs the light beam;

comparing the detected optical power to a predetermined optical power; and determining the laser light beam and the first optical fiber to be aligned if the detected optical power and the predetermined optical power are-Ret substantially equal.

11. A method for detecting an edge of an object, said method comprising:

generating a laser light beam;

receiving the laser light beam at a receiving end of a first optical fiber;

detecting the optical power of the received laser light beam; and positioning the edge of the object within the laser light beam such that the optical power of the received laser light beam is greater than a lower threshold and less than an upper threshold, wherein the lower threshold is less than half of the optical power at the detector when no part of the object obstructs the light beam and said upper threshold is greater than half of optical power at the detector when no part of the object obstructs the light beam, and wherein generating the laser light beam comprises:

optically coupling a laser light source to the first optical fiber via a three-port circulator, and reflecting the laser light beam from a mirror, the mirror being aligned to reflect the laser light beam back to the receiving end of the first optical fiber.

12. A method as in claim 11, wherein detecting the optical power of the received light comprises:

optically coupling the first optical fiber to an optical power meter via a three-port circulator.

* * * * *